United States Patent
Bejcek

(10) Patent No.: US 9,616,893 B2
(45) Date of Patent: Apr. 11, 2017

(54) AUTOMATIC TURN-SENSING GROUND SPEED REDUCTION SYSTEMS AND RELATED METHODS FOR WALK-BEHIND MACHINES

(71) Applicant: Honda Motor Co., Ltd., Tokyo (JP)

(72) Inventor: Andrew E. Bejcek, Mebane, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/515,234

(22) Filed: Oct. 15, 2014

(65) Prior Publication Data

US 2016/0106031 A1    Apr. 21, 2016

(51) Int. Cl.

| | | |
|---|---|---|
| *A01D 34/64* | (2006.01) | |
| *B60Q 1/26* | (2006.01) | |
| *B60W 30/18* | (2012.01) | |
| *A01D 34/00* | (2006.01) | |
| *A01D 34/69* | (2006.01) | |
| *A01D 101/00* | (2006.01) | |

(52) U.S. Cl.
CPC ..... *B60W 30/18009* (2013.01); *A01D 34/006* (2013.01); *A01D 34/69* (2013.01); *A01D 2101/00* (2013.01)

(58) Field of Classification Search
CPC ........ A01D 34/64; A01D 34/62; A01D 34/67; A01D 34/008; A01D 41/141; A01D 43/087; B25B 21/00; G01P 3/48; G01P 3/489; B60W 30/18009; A47L 11/28; B62D 51/007; B62D 9/00; B60Q 1/26
USPC ................ 701/70; 56/10.2 A, 10.2 R; 173/1; 324/166; 180/218
See application file for complete search history.

(56) References Cited

U.S. PATENT DOCUMENTS

| | | | | |
|---|---|---|---|---|
| 4,281,388 A | * | 7/1981 | Friend .................... | G01P 3/489 |
| | | | | 324/162 |
| 4,891,588 A | * | 1/1990 | Fujioka .................... | G01P 3/48 |
| | | | | 324/166 |
| 5,042,238 A | * | 8/1991 | White, III ................ | B62D 9/00 |
| | | | | 180/6.24 |
| 5,044,043 A | * | 9/1991 | Basham .................. | A47L 11/28 |
| | | | | 15/319 |
| 5,692,366 A | | 12/1997 | Hardesty | |

(Continued)

FOREIGN PATENT DOCUMENTS

| | | |
|---|---|---|
| JP | 2013-022987 | 2/2013 |
| JP | 2014-003937 | 1/2014 |

*Primary Examiner* — Yuri Kan

(74) *Attorney, Agent, or Firm* — Jenkins, Wilson, Taylor & Hunt, P.A.

(57) ABSTRACT

Automatic turn-sensing ground speed reduction systems and related methods for walk-behind, self-propelled machines are disclosed. In one aspect, automatic turn-sensing ground speed reduction systems and related methods can include a control unit and a sensor. The sensor can be configured to transmit a signal to the control unit. In some aspects, the sensor can include a gyroscope that can be configured to transmit the signal to the control unit, the signal corresponding to an angular velocity of the walk-behind machine measured about a vertical axis perpendicular to a ground surface on which the walk-behind machine can be self-propelled. The control unit can be configured to automatically adjust a ground speed of the walk-behind machine during turning movement of the walk-behind machine based upon the signal.

20 Claims, 7 Drawing Sheets

(56) References Cited

U.S. PATENT DOCUMENTS

| | | | |
|---|---|---|---|
| 5,884,718 A * | 3/1999 | Yamashiro | B62D 51/007 180/9.32 |
| 5,911,670 A * | 6/1999 | Angott | A01D 34/008 56/10.2 A |
| 6,092,617 A | 7/2000 | White, III et al. | |
| 6,239,696 B1 * | 5/2001 | Berger | B60Q 1/26 340/463 |
| 6,644,002 B2 | 11/2003 | Trefz | |
| 6,708,773 B1 | 3/2004 | Kinkead et al. | |
| 6,988,351 B2 | 1/2006 | Schick et al. | |
| 7,111,443 B2 | 9/2006 | Anderson et al. | |
| 7,482,768 B2 | 1/2009 | Lucas et al. | |
| 7,610,738 B2 * | 11/2009 | Daly | A01D 34/62 56/10.2 R |
| 7,728,534 B2 | 6/2010 | Lucas et al. | |
| 7,918,305 B2 | 4/2011 | Scherbring et al. | |
| 8,091,672 B2 * | 1/2012 | Gutsch | A01D 34/67 15/340.3 |
| 8,528,685 B2 | 9/2013 | Scherbring et al. | |
| 2006/0076152 A1 | 4/2006 | Haufele et al. | |
| 2009/0069988 A1 * | 3/2009 | Strosser | A01D 41/141 701/50 |
| 2009/0229233 A1 * | 9/2009 | Pollklas | A01D 43/087 56/10.2 R |
| 2012/0159916 A1 * | 6/2012 | Ishii | A01D 34/64 56/10.2 A |
| 2012/0160529 A1 * | 6/2012 | Eshleman | B25B 21/00 173/1 |

\* cited by examiner

AUTOMATIC TURN-SENSING GROUND SPEED REDUCTION SYSTEMS AND RELATED METHODS FOR WALK-BEHIND MACHINES

TECHNICAL FIELD

The subject matter disclosed herein relates generally to self-propelled, walk-behind machinery and related methods. More particularly, the subject matter disclosed herein relates to systems and methods for automatically controlling drive systems in a self-propelled, walk-behind lawnmower.

BACKGROUND

Many walk-behind lawnmowers or mowing machines are self-propelled, where one or more of the lawnmower wheels are driven in order to move the working machine. The wheel(s) are typically driven by a lawnmower drive system that can include a combustion engine or an electric motor. As a result, in self-propelled lawnmowers, there is typically a drive control, such as, for example, a mechanical drive control, located near the end of the lawnmower handle, to engage and disengage the drive system in order to prevent the lawnmower from moving at all times.

Yet, using a mechanical drive control (e.g. bale, lever) to engage and disengage the drive system can be unduly cumbersome to the operator, since it is necessary to periodically disengage the drive system when mowing a lawn— most often when mowing a lawn in rows and/or following the perimeter of the lawn. In these cases, the operator must disengage the drive system at the end of a row, or at a corner, i.e. instances where the lawnmower must be turned. In order to turn the lawnmower the operator must release the mechanical drive control, reposition the machine, and then subsequently re-engage the drive control. This sequence occurs many times even when mowing a small lawn, and requires the operator to reposition his or her hands many times in order to engage or disengage the drive system when making turns.

As a result, a need exists for a mowing machine or lawnmower that is more intuitive, more efficient, and easier to use. Specifically, a need exists for a self-propelled, walk-behind lawnmower that incorporates an automatic turn-sensing ground speed reduction system in order to allow an operator to focus only on mowing without concern about engaging and/or disengaging the drive system when turning the machine.

SUMMARY

In accordance with this disclosure, automatic turn-sensing ground speed reduction systems and related methods for walk-behind machines are provided. The use of automatic turn-sensing ground speed reduction systems and related methods for walk-behind machines can provide advantageous and unexpected results including, for example, improved control, improved ease-of-operation, intuitive controls, improved comfort during operation, low operator fatigue, and easy to understand controls.

In one aspect, an automatic turn-sensing ground speed reduction system of a walk-behind, self-propelled machine comprising a control unit and a sensor is provided. The sensor can be configured to transmit a signal to the control unit. The control unit can be configured to automatically adjust a ground speed of the walk-behind machine during turning movement of the walk-behind machine based upon the signal.

In another aspect, a walk-behind, self-propelled machine comprising an automatic turn-sensing ground speed reduction system is provided. The walk-behind machine can comprise a control unit, a sensor, and a drive system. The sensor can be configured to transmit a signal to the control unit. The drive system can be configured to propel the walk-behind machine along the ground surface at a ground speed, and the control unit can be configured to automatically adjust the ground speed of the walk-behind machine during turning movement of the walk-behind machine based upon the signal.

In a further aspect, a method for implementing turn-sensing ground speed reduction in a walk-behind, self-propelled machine is provided. The method can comprise transmitting a signal to a control unit, interpreting the signal in the control unit, and automatically adjusting a ground speed of the walk-behind machine in the control unit during turning movement of the walk-behind machine based upon the signal. These and other objects of the present disclosure as can become apparent from the disclosure herein are achieved, at least in whole or in part, by the subject matter disclosed herein.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1:
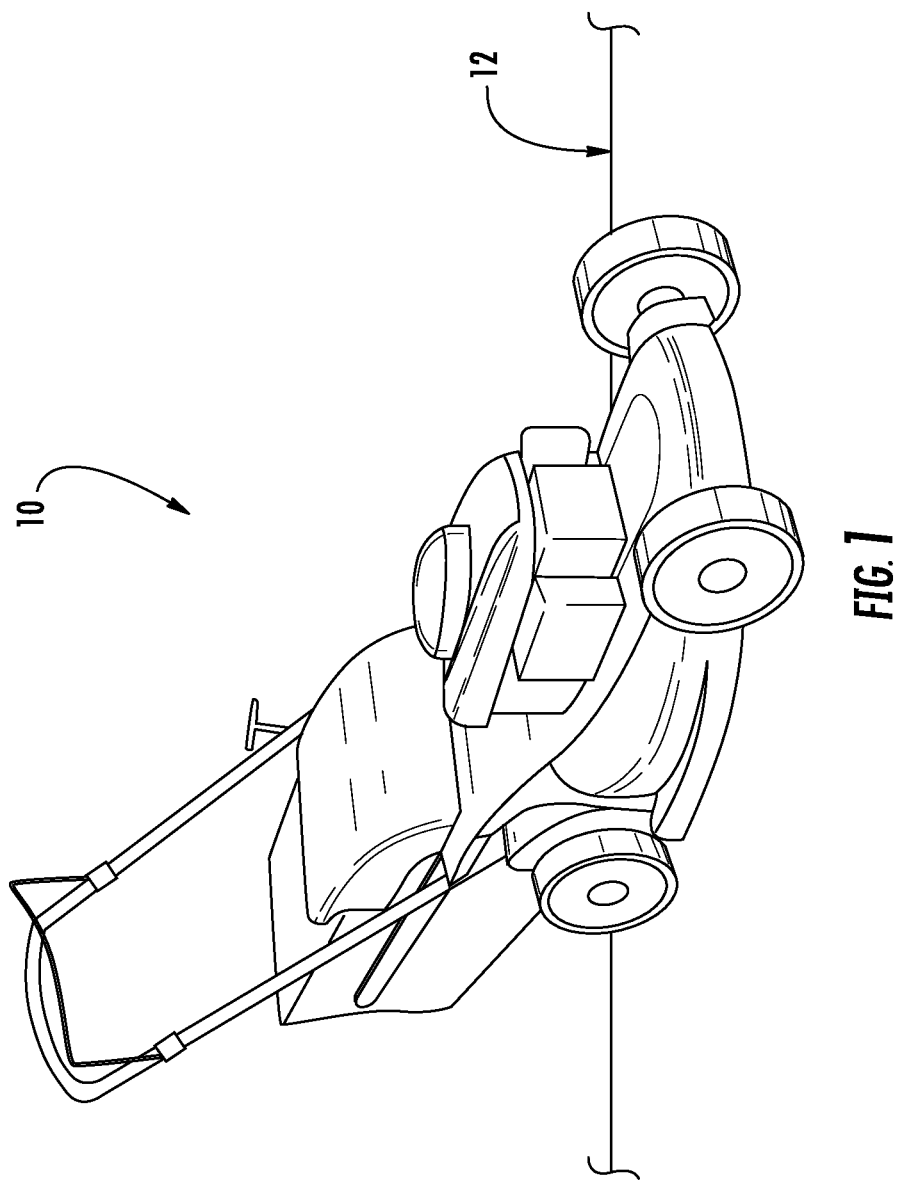
FIG. 1 is a perspective view illustrating a walk-behind machine according to an embodiment of the present subject matter.

The present subject matter provides and/or includes automatic turn-sensing ground speed reduction systems and related methods for walk-behind machines. In some aspects, such automatic turn sensing ground speed reduction systems for walk-behind machines can provide advantageous and unexpected results including, for example, improved control, increased efficiency for the operator, improved ease-of operation, intuitive controls, improved comfort during operation, low operator fatigue, and easy to understand controls.

In some aspects, automatic turn-sensing ground speed reduction systems can be for self-propelled, working machines, such as, for example, rotary blade, walk-behind lawnmowers. In other aspects, automatic turn-sensing ground speed reduction systems can be used in other types of self-propelled, working machines other than a lawnmower.

In some aspects, systems and methods described herein can be used with self-propelled, working machines having combustion engines and electric motors, while in other aspects the systems and methods described herein can be used in a working machine having an electric engine, for e.g. a plug-in electric or battery powered electric working machine. In some aspects, systems and methods described herein can control aspects of electric transmissions, which can transmit power to one or more wheels of the self-propelled machines. In some aspects, controls, systems, and methods described herein can comprise electric controls configured to start and/or control aspects of the electric transmissions.

In some aspects, systems and methods described herein can comprise one or more controls which can be engaged by operators before, during, or as the operators steer the self-propelled machines. For example, the controls can comprise a ground speed control adapted to electrically communicate with the transmission, which can be actuated by an operator before, during, or as the operator steers a self-propelled machine. In some aspects, for example, the controls can be disposed over gripping portions of a control device or system, thereby allowing one-handed (e.g., single handed) control over and/or operation of the self-propelled machine.

In some aspects, the one or more electric controls can electrically communicate with the transmission via a control unit, which can be electronic. The control unit can comprise an electrical device configured to provide operational sequencing. In some aspects, the subject matter described herein may be implemented in software in combination with hardware and/or firmware.

For example, the subject matter described herein may be implemented in software executed by a processor (e.g., a hardware-based processor), microprocessor, and/or microcontroller of electric control unit. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, logic devices, logic transistors, chip memory devices, programmable logic devices, such as field programmable gate arrays, and application specific integrated circuits. In addition, a computer readable medium that implements the subject matter described herein may be located on a single device or computing platform or may be distributed across multiple devices or multiple computing platforms.

As used herein, the terms "signal" and "pulse" are generic to multiple forms of communication unless otherwise specified. For example, "signal" can include electrical, digital or analog signals. Additionally, in some embodiments, other forms of communication may be included.

As used herein, the terms "controller", and/or "control unit" refer to software in combination with hardware and/or firmware for implementing features described herein. In some embodiments, a controller may include a microprocessor, a processor, or a microcontroller.

Aspects of the present subject matter now will be described more fully hereinafter with reference to the accompanying drawings, in which some aspects of the present subject matter are shown. This present subject matter may, however, be embodied in many different forms and should not be construed as limited to the embodiments set forth herein. Like numbers refer to like elements throughout.

As illustrated in the various figures, some sizes of structures or portions are exaggerated relative to other structures or portions for illustrative purposes and, thus, are provided to illustrate the general structures of the present subject matter. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene. References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Furthermore, relative terms such as "on", "above", "upper", "top", "lower", or "bottom" are used herein to describe one structure's or portion's relationship to another structure or portion as illustrated in the figures. It will be understood that relative terms such as "on", "above", "upper", "top", "lower" or "bottom" are intended to encompass different orientations of the package or component in addition to the orientation depicted in the figures. For example, if the package or component in the figures is turned over, structure or portion described as "above" other structures or portions would now be oriented "below" the other structures or portions. Likewise, if the package or component in the figures are rotated along an axis, structure or portion described as "above", other structures or portions would be oriented "next to" or "left of" the other structures or portions.

Unless the absence of one or more elements is specifically recited, the terms "comprising", including", and "having" as used herein should be interpreted as open-ended terms that do not preclude the presence of one or more elements.

In one aspect, the presently disclosed subject matter discloses automatic turn-sensing ground speed reduction systems and related methods for walk-behind, self-propelled machines. As shown in FIG. 1, for example, a walk-behind, self-propelled machine, generally designated 10, can be configured to be operated on a ground surface 12. The walk-behind, self-propelled machine can be a lawnmower such as for example lawnmower 10, although other powered machines are also envisioned. Lawnmower 10 can comprise an engine 30 that is configured to drive the operation of a working element 40, such as one or more rotary lawnmower blades. Specifically, for example, engine 30 can comprise a crankshaft 50, which can directly power working element 40. Machine 10 can further comprise a self-propelled drive system or transmission 60 configured to supply power via a transmission motor 62 to one or more wheels 70 of walk-behind machine 10 at a selected forward ground speed. Rather than being mechanically driven by engine 30 directly, however, transmission 60 can be electrically driven, and the operation of drive system or transmission 60 can be controlled by control unit 80 in communication with engine 30, a control device 90, and a sensor 100, where control unit 80 and sensor 100 can be a component of an automatic turn-sensing ground speed reduction system, generally designated 20. Automatic turn-sensing ground speed reduction system 20 can be incorporated into working machine 10. For example, one embodiment of automatic turn-sensing ground speed reduction system 20 incorporated into machine 10 is illustrated in FIG. 2A.

Engine 30 of self-propelled machine 10 can be configured as a combustion engine that is capable of driving working element 40. Engine 30 can additionally provide power to control unit 80. In one aspect, engine power can be communicated to control unit 80 as alternating current or AC power. Where engine 30 is configured to communicate AC power to control unit 80, then control unit 80 can convert AC power to DC power. In one aspect, as illustrated in FIG. 2B, control unit 80 can be configured such that engine 30 can transmit power directly to a rectifier 84 or any other device that converts alternating current (AC) to direct current (DC). After power has been converted from AC power to DC power, a DC power bus 86 can communicate the power in the form of a signal or pulse to a power delivery system, generally designated 88, in order to control the power supplied to transmission motor 62. Power delivery system 88 can comprise that of a pulse width modulator or (PWM), a potentiometer, or a rheostat. In one aspect, power delivery system 88 can increase or decrease the power supplied to transmission motor 62.

The electrical power and ground speed control to be delivered to transmission motor 62 can be dependent on the signal transmitted from a microcontroller (MCU) 82 also integrated into control unit 80. MCU 82 can further be configured to receive at least a ground speed control signal and a sensor signal from a control device 90 and a sensor 100, respectively. MCU 82 can be configured with a drive control multiplier that can analyze the angular acceleration and/or angular velocity input measured by sensor 100 in light of threshold values, and subsequently scale the ground speed control input correspondingly. A control scheme such as, for e.g. the drive control multiplier, can be configured to be selectively enabled or disabled by the operator. Where the drive control multiplier is selectively disabled, the selected ground speed of self-propelled machine 10 can be consistently reflected in the actual ground speed of self-propelled machine 10.

Figure 2A:
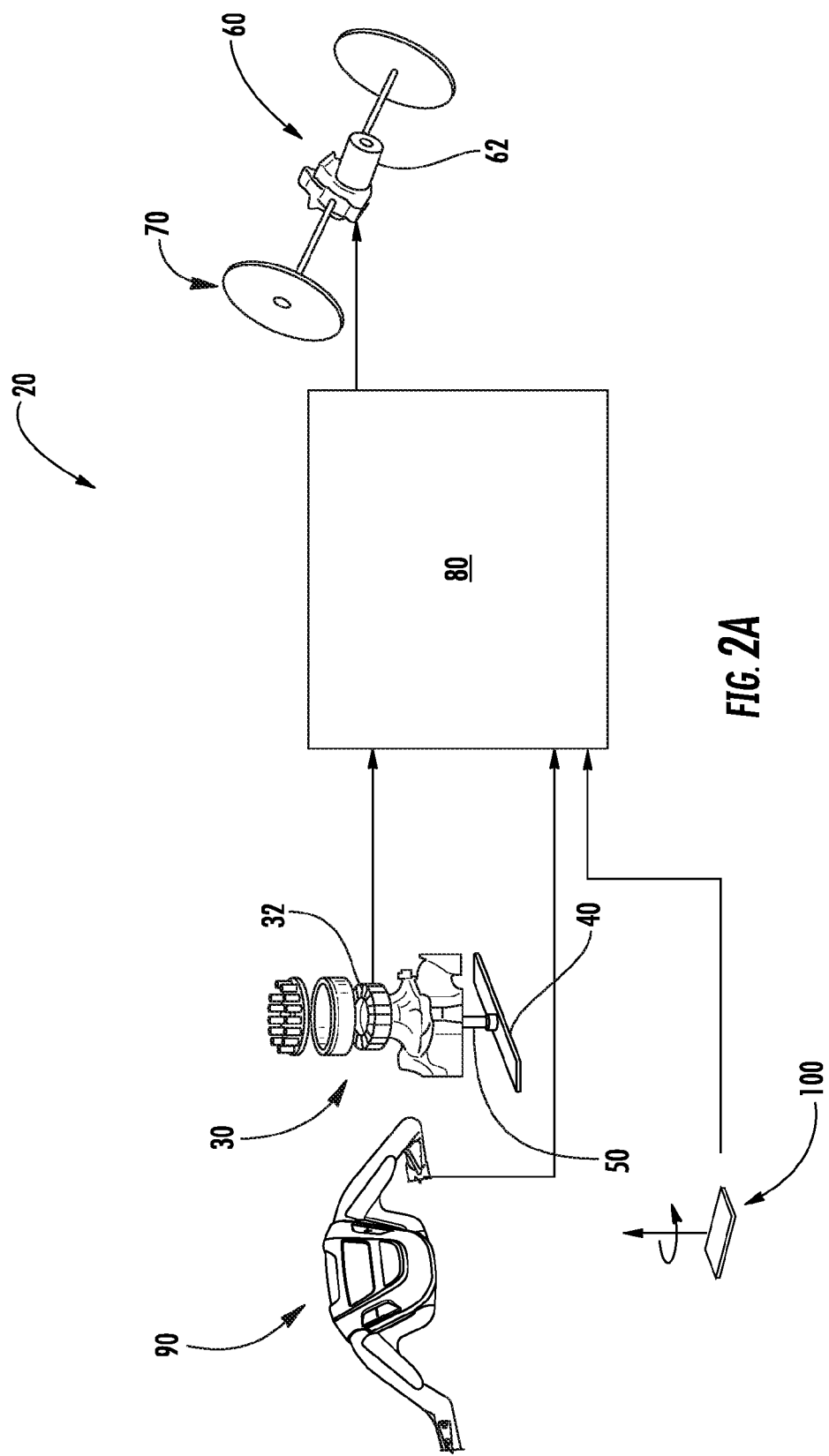
FIG. 2A is a schematic representation of an automatic turn-sensing ground speed reduction system for a walk-behind machine according to an embodiment of the present subject matter.
Figure 2B:
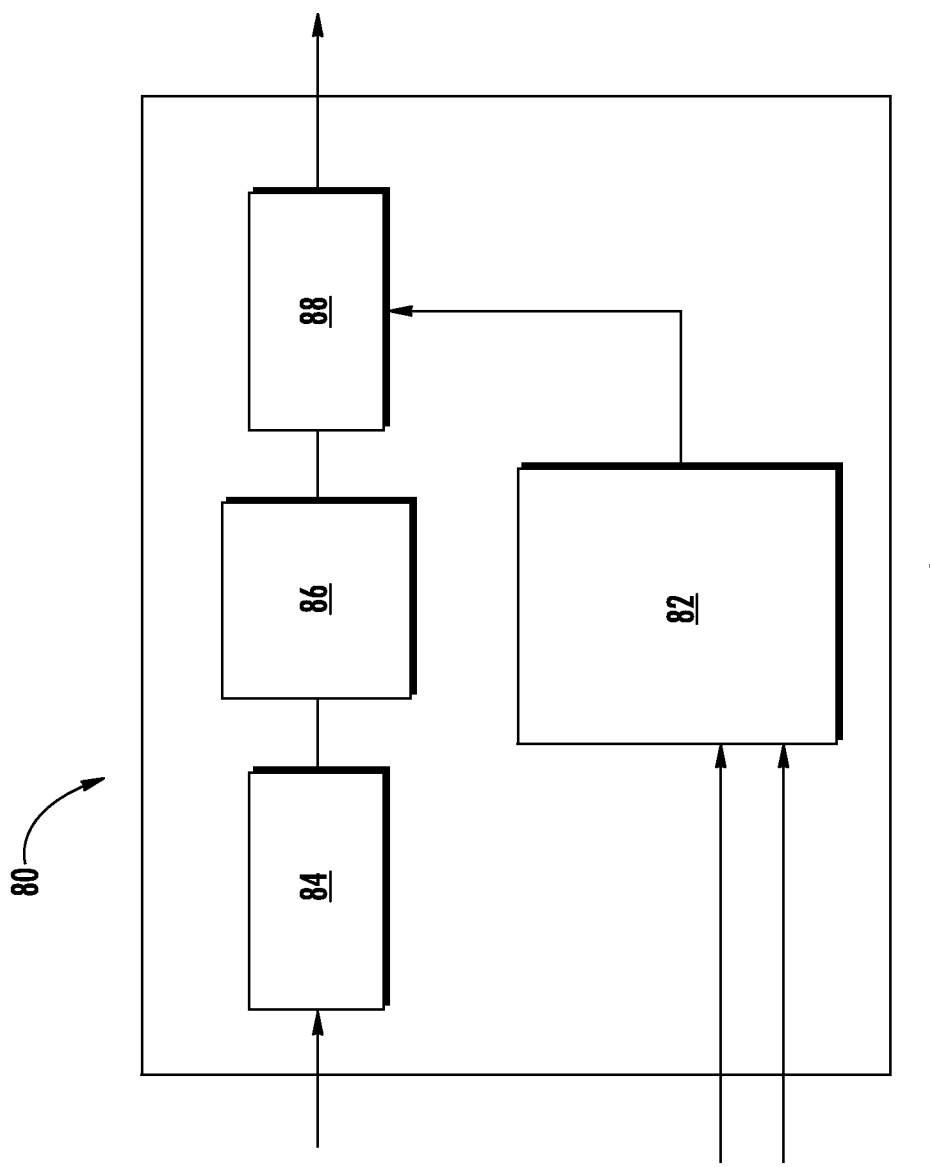
FIG. 2B is a detailed schematic representation of a control unit of the automatic turn-sensing ground speed reduction system for the walk-behind machine according to FIG. 2A.

Transmission 60 can comprise, for example, an electric transmission and a transmission motor 62 that can be an electric transmission motor powered using an electrical actuator or generator 32 and/or a battery if engine 30 is not running (See, e.g., FIG. 2A). In some aspects, electrical actuator or generator (or any other type of rotating object) 32 can be coupled and/or mounted onto crankshaft 50 of engine 30. Electric transmission motor 62 can be adapted to power transmission 60, and transmission 60 can be adapted to transfer and/or supply power to one or more wheels 70 of self-propelled machine 10.

Figure 3A:
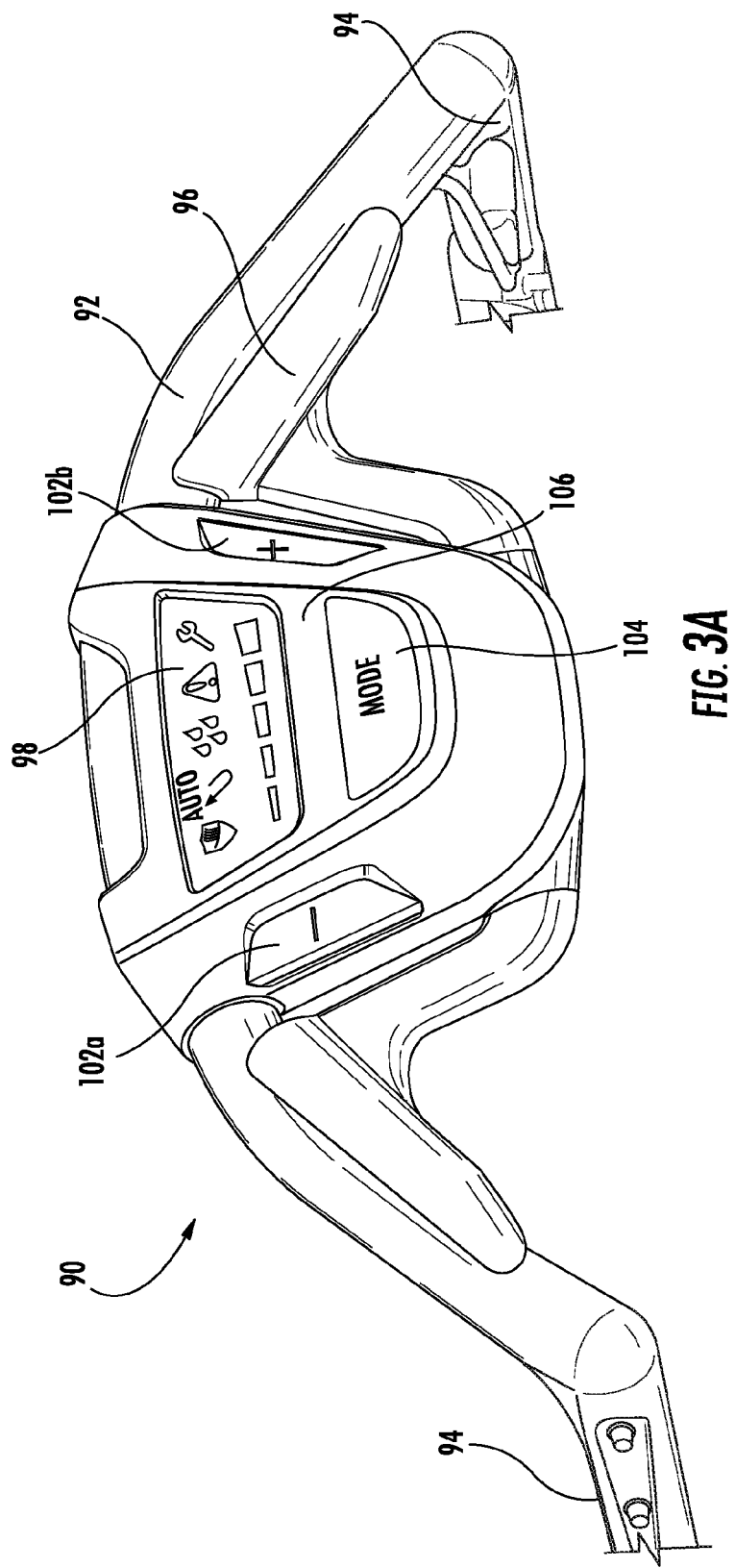
FIG. 3A is a front perspective view of a first embodiment of an actuation mechanism of the automatic turn-sensing ground speed reduction system for the walk-behind machine according to FIG. 2A.
Figure 3B:
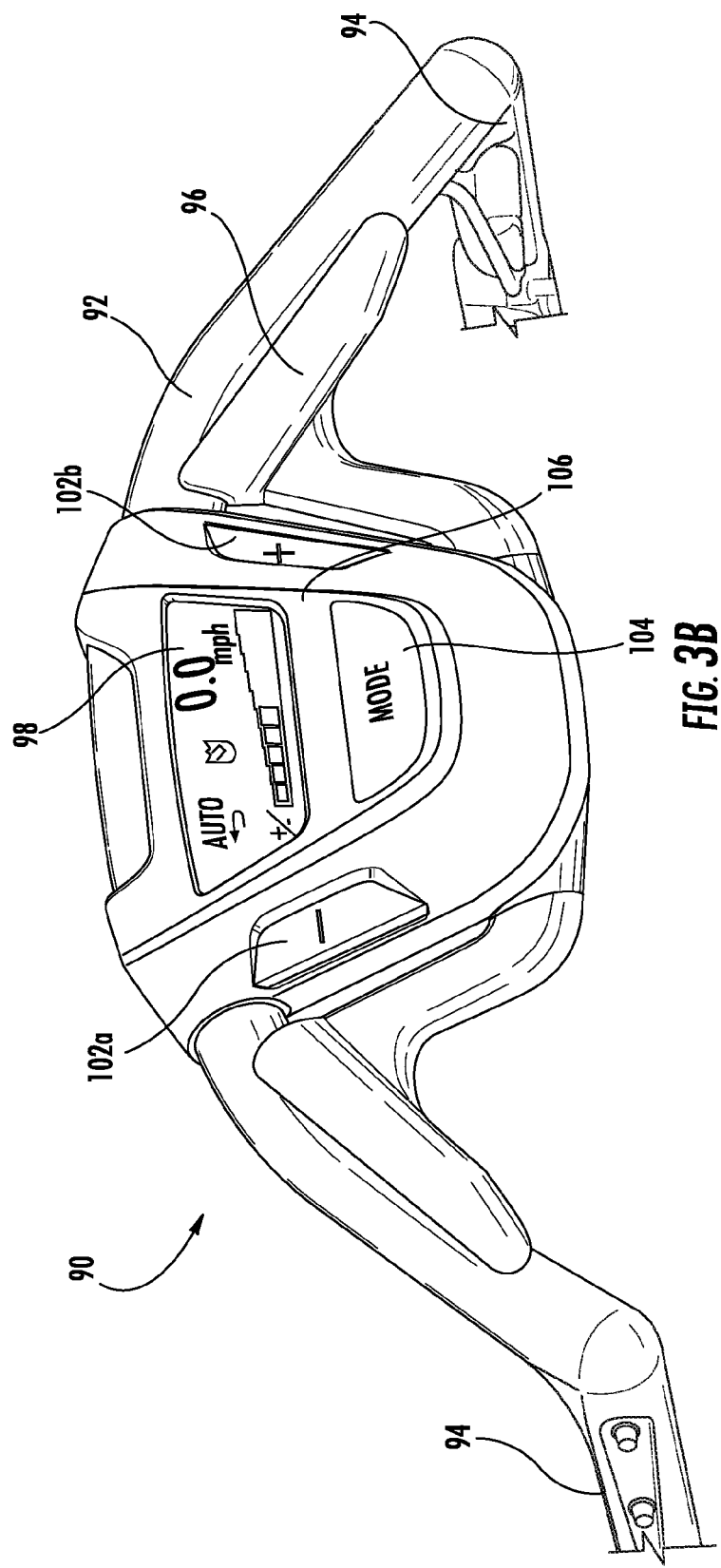
FIG. 3B is a front perspective view of a second embodiment of an actuation mechanism of the automatic turn-sensing ground speed reduction system for the walk-behind machine according to FIG. 2A.

Regarding the control of the ground speed in automatic turn-sensing ground speed reduction system 20, FIGS. 3A-3B are perspective views of two embodiments of a control device 90 that can be used in walk-behind machine 10. In some aspects, control device 90 can be provided at a distal end portion of a handle 92 that extends behind a main operative assembly of walk-behind machine 10. A control system base 106 can be attached to or otherwise positioned near handle 92. As shown in both FIGS. 3A-3B, for example, handle 92 can comprise one or more legs 94 that extend behind the main operative assembly of walk-behind machine 10, and control device 90 can be coupled to a distal end of the one or more legs 94. In some aspects, control device 90 can comprise one or more grips or gripping portions of handle 92 to which an operator can grasp while walking behind machine 10 during movement thereof.

Additionally, control device 90 can advantageously comprise one or more controls and/or actuation mechanisms for activating and/or controlling one or more engines of the machine, and/or for controlling a speed and/or motion thereof. Notably, the controls and/or actuation mechanisms can be intuitive and/or easily reachable from the one or more gripping portions (e.g., disposed over one of the one or more legs 94). Control device 90 can advantageously provide for one-handed control and steering of walk-behind machine 10. Specifically, for example and in some aspects, control device 90 can comprise a ground speed control 96 and first and second adjustment actuators 102a and 102b, respectively. In the particular configuration shown in FIGS. 3A-3B, for example, ground speed control 96 can be a control lever that is pivotable with respect to handle 92 to selectively engage and precisely control the ground speed of machine 10. Those having ordinary skill in the art will recognize, however, that ground speed control 96 can be provided in any of a variety of other forms, including but not limited to a dial, handle, push button, knob, or any other device that is sensitive to touch. First adjustment actuator 102a and second adjustment actuator 102b can be provided proximate to ground speed control 96 and can be used in combination with ground speed control 96 to further control the operating state of working machine 10. First and second adjustment actuators 102a, 102b can be a push button. Those having ordinary skill in the art will recognize, however, that first and second adjustment actuators 102a and 102b can be provided in any of a variety of other forms, including but not limited to a tactile switch, a capacitance sensor, a membrane with capacitance sensing, or any other device that is sensitive to touch.

Regarding the particular operation of automatic turn-sensing ground speed reduction systems and related methods disclosed herein, ground speed control 96, in conjunction with adjustment actuators 102a and 102b, can be configured to be operable by an operator to assign a desired ground speed of self-propelled machine 10. In particular, the assigned ground speed can be selectively chosen by the operator through manipulation of ground speed control 96, such as by pivoting ground speed control 96 with respect to control system base 106 to any of a range of operating positions corresponding to one of a predetermined range of assigned ground speeds. In addition, fine adjustments of the ground speed of working machine 10 can be made without diminishing the operator's ability to control working machine 10 by way of first and second adjustment actuators 102a and 102b. For example, in one aspect, first adjustment actuator 102a can be operable to change the maximum speed setting of the self-propel system to have a decrementally lower value, whereas second adjustment actuator 102b can be operable to change the maximum speed setting of the self-propel system to have an incrementally higher value. This operability advantageously allows an operator to choose a ground speed that best suits the terrain and/or the operator's mobility, among other factors. The assigned ground speed can be selected by the operator while ground speed control 96 can be configured to transmit the assigned ground speed, in the form of a signal or pulse, to transmission 60 via control unit 80. For example, ground speed control 96 can be configured to transmit an electrical signal or pulse (e.g. a control signal) to control unit 80 by way of an electrical sensor. Ground speed control 96 can alternatively be configured to transmit a digital or analog signal to control unit 80, while other alternative means of communication can also be utilized. In one aspect, the control signal can communicate the assigned ground speed to control unit 80 essentially as a ratio of the assigned ground speed compared to a maximum ground speed setting.

Control device 90 can further comprise a display 98 and a program selection control 104 provided on control system base 106. Display 98 can provide warnings or other indications of the operating state of working machine 10, while program selection control 104 can provide an ability for the operator to switch between different programs and program modes. In some aspects, for example, display 98 can be disposed in a central location on control system base 106 in a position that is easily readable to operators, and program selection control 104 can be disposed beneath display 98. In FIG. 3A, a first embodiment of display 98 is illustrated, such that display 98 is an LED display utilizing an array of light emitting diodes (LEDs) as a video display. Alternatively, in FIG. 3B, a second embodiment of display 98 is illustrated, such that display 98 is an LCD. Display 98 can also be any other type of display suitable to provide warnings or other indications of the operating state of working machine 10.

In some aspects, automatic turn-sensing ground speed reduction system 20 can be activated or deactivated at control device 90. For example, an operator can utilize a combination of program selection control 104 and adjustment actuators 102a, 102b to scroll through and select various features and programs displayed on display 98. As illustrated in FIGS. 3A and 3B, display 98 can be configured to display visual confirmation (e.g. a symbol synonymous with automatic turn-sensing ground speed reduction system 20 can be displayed on display 98 when activated and not displayed on display 98 when deactivated) that the operator has chosen to selectively activate or deactivate automatic turn-sensing ground speed reduction system 20, as well as any other features or programs provided in machine 10. In another embodiment of control device 90, display 98 can be interactive by touch (not shown), whereby the operator can utilize icons, a menu system, etc., to selectively activate or deactivate the features of machine 10.

Automatic turn-sensing ground speed reduction system 20 can additionally comprise a sensor 100 that can detect and transmit to control unit 80 a signal corresponding to velocity, angular velocity, acceleration, angular acceleration, orientation, gravitational forces, etc., of walk-behind machine 10. Sensor 100 can be disposed at any location on walk-behind machine 10 that can allow sensor 100 to be electrically and/or mechanically connected to automatic turn-sensing ground speed reduction system 20. In one aspect, sensor 100 can be connected to a printed circuit board (PCB) of one of the components of automatic turn-sensing ground speed reduction system 20. For example, sensor 100 can be connected to an existing PCB on control device 90, specifically handle 92, or at control unit 80.

As illustrated in FIG. 2A, sensor 100 can be configured as a vibrating structure gyroscope such as one manufactured with microelectromechanical systems (MEMS) technology that is able to detect the angular velocity of walk-behind machine 10 about a vertical axis perpendicular to the ground. In other aspects, sensor 100 can be an accelerometer, an inertial measurement unit (IMU), or any other relevant type of device that can measure and report velocity, angular velocity, acceleration, angular acceleration, orientation, gravitational forces, etc. of working machine 10. Angular velocity is a vector quantity which specifies the angular speed of an object and an axis about which it rotates. Therefore, turning of machine 10 can result in a change in magnitude of the angular velocity measured by sensor 100. Thus, sensor 100 can detect when an operator is rotating walk-behind machine 10 with respect to the ground (i.e. turning walk-behind machine 10) and can transmit such information to control unit 80 in the form of an analog, digital or electrical signal or pulse. However, other alternative means of communication can also be utilized.

As discussed in more detail herein, control unit 80 can be configured to receive power from engine 30, a control signal (e.g. ground speed) from control device 90, and a sensor signal (e.g. angular velocity) from sensor 100, in order to provide power to and drive working machine 10. In order to do so, control unit 80 is configured with a control scheme in order to automatically alter the output to transmission 60 based on whether certain thresholds (e.g. predetermined acceleration and deceleration thresholds) are exceeded. In practice, this results in control unit 80 automatically reducing or completely shutting off output to drive system 60 when an operator is turning lawnmower 10. By comparison, in conventional self-propelled machines, such as lawnmowers, turning the lawnmower, for example, at the end of a row, requires the operator to reposition his or her hands in order to engage or disengage the drive system. With such conventional lawnmowers, the operator typically has needed to either manually reduce the transmission speed (e.g. reduce any operator selected speed input, where such speed input was coupled to the transmission) or disengage the transmission drive completely. Accordingly, the drive control multiplier that can be incorporated into control unit 80 is advantageous because it can enable the operator to maintain a constant setting of the actuation mechanism without any concern about reducing the speed or disengaging ground speed control 96 when turning machine 10.

For example, control unit 80 can be configured with an automatic drive control multiplier scheme that analyzes whether the signal or pulse input received from sensor 100 exceeds a certain threshold. If such a threshold is exceeded this can be indicative that machine 10 is turning and drive system 60 needs to be shut off. Thus, control unit 80 can apply a numeric control multiplier against the input ground speed, which in turn can affect the output to drive system 60.

Figure 4:
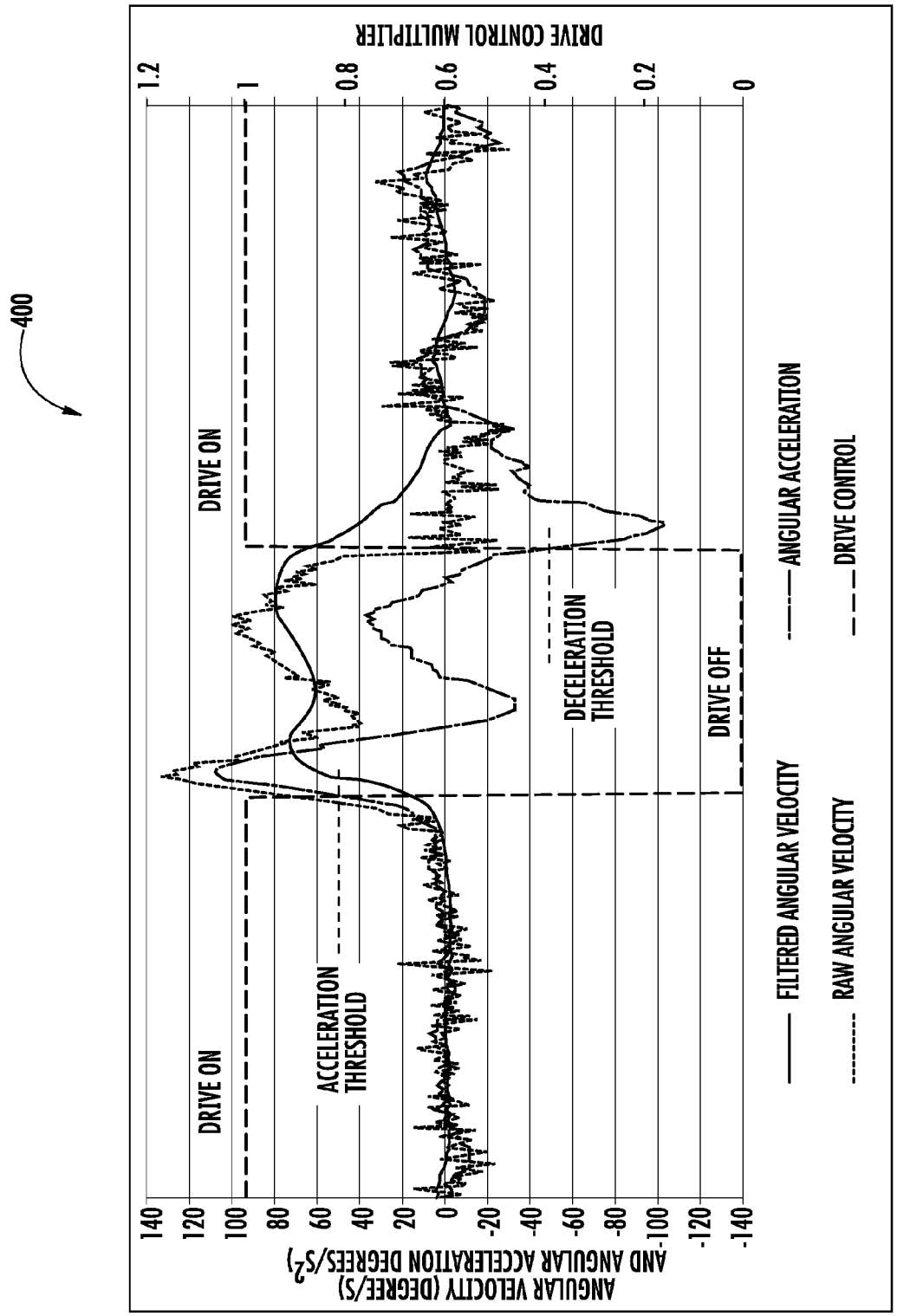
FIG. 4 is a graphical representation of an exemplary automatic turn-sensing ground speed reduction sequence for a walk-behind machine according to an embodiment of the present subject matter.

FIG. 4 illustrates an exemplary graphical operating sequence 400 of how the drive control multiplier can control drive system 60. In one aspect, and with regard to FIG. 4, sensor 100 can detect an angular velocity of machine 10 and can transmit the angular velocity to control unit 80. Control unit 80 can be configured to apply a filter to the angular velocity in order to smooth and eliminate short term spikes in the raw angular velocity measurement, where such spikes can be caused by small rotation events (e.g. bumpy ground) versus full rotations of machine 10. For example, a first order recursive filter can be applied to the angular velocity in order to prevent false triggering of system 20. An example of a filter used can be seen below:

$$\text{filtered value} = a0 * \text{current\_raw\_value} + b1 * \text{previous\_filtered\_value}$$

where $(a0+b1)=1$, and $a0$ and $b1$ are two coefficients.

A time constant of the filter can be adjusted by changing coefficients a0 and b1.

Angular acceleration can then be calculated based on the filtered angular velocity of machine 10 detected by sensor 100. Control unit 80 can then compare the calculated angular acceleration against a certain predetermined angular acceleration threshold. The predetermined angular acceleration threshold can be determined by a sensitivity setting which can be set per application of machine 10. Thus, the predetermined angular acceleration threshold can differ depending on the target user (e.g. how aggressive would a typical target user be when turning machine 10) and also the machine, itself (e.g. a heavier machine will result in a slower turn). Where an angular acceleration of machine 10 does not exceed a certain predetermined angular acceleration threshold, control unit 80 can be configured to implement a control scheme so that the output to drive system 60 is not limited in any way. Referring to FIG. 4, for example, if control unit 80 determines that a calculated angular acceleration of machine 10 is less than a predetermined angular acceleration threshold of, for e.g. 50 degrees per second squared (°/s²), control unit 80 can apply a drive control multiplier of 1 to the ground speed input, so that the ground speed of self-propelled machine 10 is in no way scaled down or limited.

In another aspect, if control unit 80 determines that the calculated angular acceleration exceeds the predetermined angular acceleration threshold, then control unit 80 can be configured to implement the control scheme so that the output to drive system 60 is limited or even shut off, completely. For example, still referring to FIG. 4, if control unit 80 determines that the calculated angular acceleration of machine 10 is more than a predetermined angular acceleration threshold of, for e.g. 50 degrees °/s², a drive control multiplier less than 1 (e.g. the drive control multiplier can be between 1 and 0 if drive system 60 is to be merely slowed down, while the drive control multiplier can be 0 if drive system 60 is to be stopped completely) can be applied to the ground speed input, so that the ground speed of self-propelled machine 10 is scaled down and limited, or even stopped. Machine 10 is configured such that the calculated angular acceleration can exceed the predetermined angular acceleration threshold only when machine 10 is turning.

In this aspect, sensor 100 can detect an angular velocity of machine 10 in an opposite direction once machine 10 begins to turn. As a result, once machine 10 has turned fully and resumes travel along a straight path, the angular deceleration can increase until it exceeds a certain predetermined angular deceleration threshold. The predetermined angular deceleration threshold can be determined in a manner similar to that of the predetermined angular acceleration threshold as discussed above. Thus, if control unit 80 determines that a calculated angular deceleration (i.e. angular acceleration that exceeds the initial acceleration in the opposite direction) exceeds a certain predetermined angular deceleration threshold, then control unit 80 can be configured to implement the control scheme so that the output to drive system 60 is not limited in any way. For example, and referring to FIG. 4, if control unit 80 determines that the calculated angular deceleration of machine 10 is more than a predetermined angular deceleration threshold of, for e.g. −50 °/s², a drive control multiplier of 1 can be applied to the ground speed input, so that the ground speed of self-propelled machine 10 can resume and is in no way scaled down or limited.

Accordingly, until the calculated angular deceleration exceeds the predetermined angular deceleration threshold, control unit 80 can continue to apply a drive control multiplier between 1 and 0 if drive system 60 is to be merely slowed down, or 0 if drive system 60 is to remain completely stopped.

Figure 5:
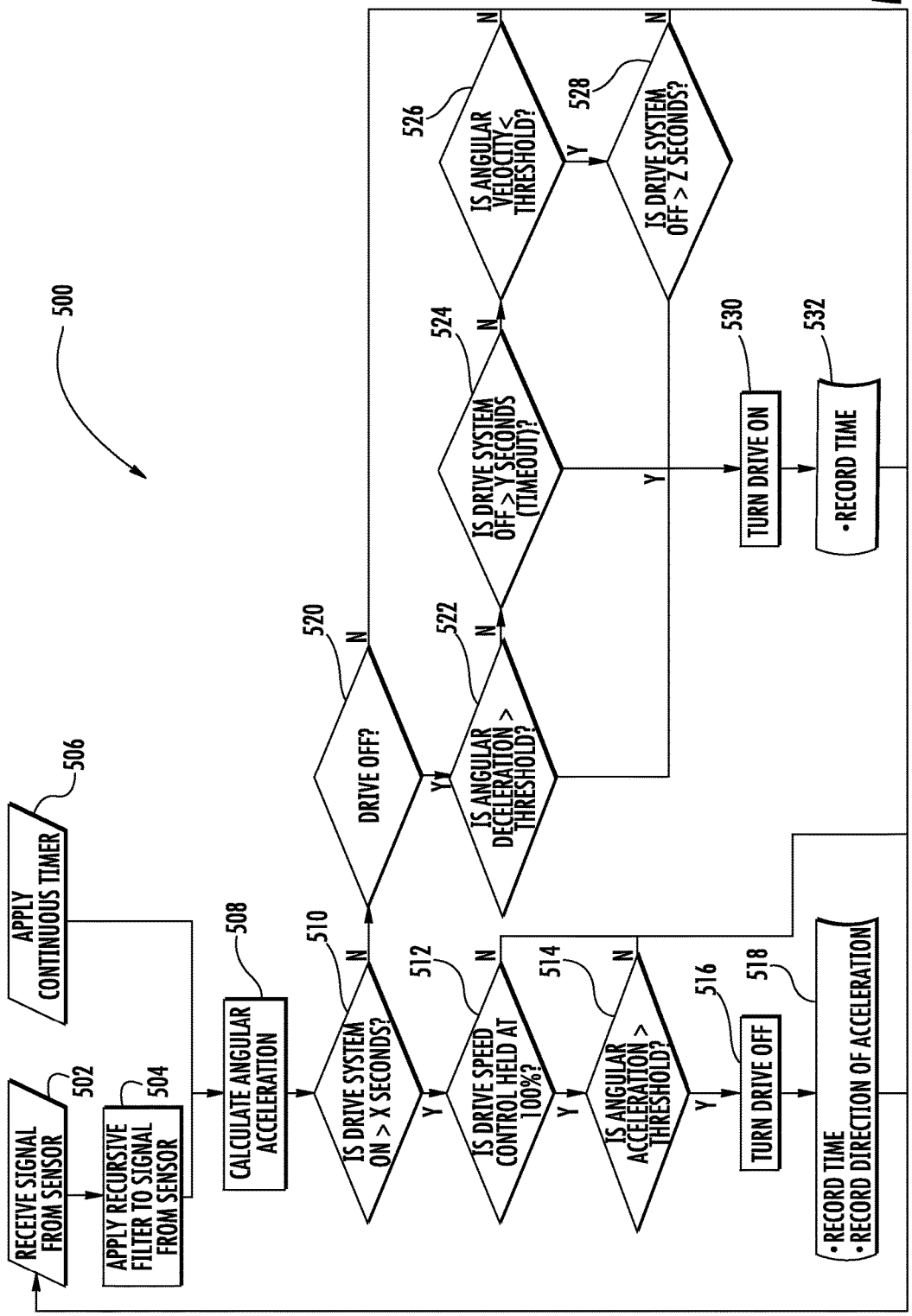
FIG. 5 is a flow chart of the control logic of an automatic turn-sensing ground speed reduction system for a walk-behind machine according to an embodiment of the present subject matter.

In other aspects, the automatic drive control multiplier scheme implemented by control unit 80 can be disabled by the operator so that the operator can manually control the ground speed of self-propelled machine 10 using a control mechanism (e.g. lever, knob, button, etc.). For example, an operator can selectively activate and deactivate the automatic drive control multiplier by manipulating a combination of actuators 102a, 102b and program selection control 104. In this regard, FIG. 5 is a flow chart illustrating an exemplary method, generally designated 500, for automatic turn-sensing ground speed reduction in a walk-behind machine 10. In some aspects, method 500 can be implemented in control unit 80. A person of ordinary skill in the art can understand that not all steps referenced in FIG. 5 are necessary and some can even be eliminated. In addition, the order at which the steps are performed in method 500 is only to illustrate some embodiments of the subject matter described herein, and in no way is illustrative of the only possible manner of performing method 500.

Referring to FIG. 5, at step 502, a signal or pulse from a sensor 100 can be received by a control unit 80. For example, the signal or pulse received from sensor 100 can contain data regarding an angular velocity of walk-behind machine 10. The signal or pulse can contain data regarding the magnitude and direction of the angular velocity of machine 10. At step 504, control unit 80 can apply a recursive filter to the signal or pulse received from sensor 100. For example, a first order recursive filter can be applied to the angular velocity data received from sensor 100.

At step 506, a continuous timer can be initiated. The continuous timer can be disposed in control unit 80 in order to implement the time based decisions in steps 510, 524 and 528 of method 500. At step 508, control unit 80 can calculate an angular acceleration of self-propelled machine 10 using the filtered angular velocity and the data from the timer.

At step 510, control unit 80 can determine whether transmission or drive system 60 has been running for more than a predetermined length of time, generally designated X. Step 510 can be used in method 500 in order to prevent system 20 from turning off drive system 60 immediately after drive system 60 is turned back on. For example, predetermined length of time X can be 1.5 seconds, which can be preprogrammed into control unit 80. Where transmission 60 has been on for more than predetermined length of time X, method 500 can proceed to step 512, to determine whether drive speed control 96 is being held at 100% capacity.

At step 512, control unit 80 can determine whether drive speed control 96 is being held at 100% capacity. For example, where drive speed control 96 is a lever as illustrated in FIGS. 3A-3B, when an operator pivots control 96 so that it is in an operating position corresponding to a maximum ground speed or maximum operating state of transmission 60, drive speed control 96 can be considered being at 100% capacity. Therefore, method 500 can proceed to the next step (i.e. step 514) only if system 60 is operating at maximum capacity in order to prevent activation when machine 10 is navigating around obstacles (e.g. trees) at lower speeds. If drive speed control 96 is not held at 100% capacity, then method 500 can return to step 502.

At step 514, control unit 80 can determine whether the angular acceleration of machine 10 is greater than a predetermined angular acceleration threshold. The predetermined angular acceleration threshold can be part of a scheme implemented by control unit 80 to automatically control the speed of drive system 60 upon turning of self-propelled machine 10. The predetermined angular acceleration threshold can be a vector quantity calculated from the angular velocity. The predetermined angular acceleration threshold can comprise both magnitude and direction. For example, the predetermined angular acceleration threshold can be approximately 50 degrees per second squared ($°/s^2$). Control unit 80 can be configured to compare the actual angular acceleration against the predetermined angular acceleration threshold. Where the actual angular acceleration is greater than the threshold value, the method can proceed to step 516. Conversely, where the actual angular acceleration is less than the threshold value, the method can return to step 502 and repeat the same method steps. p At step 516, control unit 80 can be configured to turn drive system 60 off where the actual angular acceleration is more than the predetermined threshold value. For example, the control scheme implemented by control unit 80 can apply a drive control multiplier of zero (0) to the ground speed control signal in order to shut off drive system 60. To merely slow down drive system 60, a drive control multiplier between one (1) and 0 can be applied. Based on this logic, it can be apparent to one of ordinary skill in the art that the smaller the drive control multiplier the more the assigned ground speed will be limited.

At step 518, once drive system 60 is turned off, data can be stored in control unit 80. Such data can consist of at least a recorded time indicative of the actual time that system 60 was turned off (relative to the continuous time of step 506) and a direction of the angular acceleration. Thus, the recorded time can be recorded in control unit 80 as the amount of time (e.g. in milliseconds) since system 60 was last on. After recordation of such information, method 500 can return to step 502.

Conversely, at step 510, if control unit 80 determines that drive system 60 has not been running for more than the predetermined length of time, then method 500 can proceed to step 520. At step 520, control unit 80 can determine whether or not drive system 60 is off. For example, drive system 60 can be off if in a previous step of method 500, i.e. at step 512, control unit 80 determined that drive speed control 96 was held at 100% and that at step 514, control unit 80 determined that the actual angular acceleration was more than the predetermined angular acceleration threshold. As a result, if drive system 60 is shut down or off, then method 500 can proceed to steps 522-526. If any one of steps 522-526 has a positive answer (e.g. YES), method 500 can continue to step 530. However, if at step 520, control unit 80 determines that drive system 60 is, in fact, on, then method 500 can return to step 502. For example, drive system 60 can be on, but on for less than predetermined length of time X when machine 10 has just been started by an operator or when an auto-turn sequence of machine 10 has just been completed.

At step 522, control unit 80 can determine whether an angular deceleration of drive system 60 is greater than a predetermined angular deceleration threshold. In other words, control unit 80 can determine whether angular acceleration exceeds the predetermined angular deceleration threshold in an opposite direction of either the initial acceleration or an opposite direction of the most recently recorded acceleration (see step 518), whichever of these two is most recent (i.e. the operator is turning self-propelled machine 10). The predetermined angular deceleration threshold can be part of a scheme implemented by control unit 80 to automatically control the speed of drive system 60 upon turning of self-propelled machine 10. The predetermined angular deceleration threshold can be a vector quantity calculated using both magnitude and direction. For example, the predetermined angular deceleration threshold can be measured at approximately negative 50 degrees per second squared ($°/s^2$). Control unit 80 can be configured to compare the actual angular deceleration against the predetermined angular deceleration threshold. Where the actual angular deceleration is greater than the threshold value, the method can proceed to step 530 and can automatically reengage drive system 60 to continue driving self-propelled machine 10 at the operator assigned ground speed input. Conversely, where the actual angular deceleration is less than the threshold value, method 500 can proceed to step 524.

At step 524, control unit 80 can determine whether transmission or drive system 60 has been running for more than a predetermined length of time or a timeout limit, generally designated Y. Predetermined length of time Y can be set based on the maximum anticipated time to complete a turn of machine 10, and can be totally independent of predetermined length of time X at step 510. In some aspects, timeout limit Y can comprise a length of time that drive system 60 has remained off due to angular acceleration being greater than the predetermined angular acceleration threshold (e.g. step 514). For example, predetermined length of time Y can be 2.5 seconds, which can be preprogrammed into control unit 80. Thus, step 524 assumes that a "normal" turn can be complete within predetermined length of time Y, such that upon predetermined length of time or timeout limit Y, drive system 60 can be turned back on even if the criterion in step 522 was not met. If, at step 524, control unit 80 determines that drive system 60 has been off for more than predetermined length of time Y, drive system 60 can be considered to have timed out and method 500 can proceed to step 530 and automatically reengage drive system 60 to continue driving self-propelled machine 10 at the operator assigned ground speed input. Conversely, at step 524, if control unit 80 determines that drive system 60 has not been off for more than predetermined length of time Y, then method 500 can proceed to step 526.

At step 526, control unit 80 can be configured to determine whether the angular velocity of self-propelled machine 10 is less than a predetermined angular velocity threshold. The actual angular velocity of self-propelled machine 10 can be measured by sensor 100 about an axis perpendicular to the ground, whereas the predetermined angular velocity threshold can be preprogrammed into control unit 80. The predetermined angular velocity threshold can be a variable threshold that can be set as a proportion of the ground speed. For example, the predetermined angular velocity can range from 15 to 55 degrees per second. Similar to the predetermined angular acceleration and/or deceleration threshold(s) the predetermined angular velocity threshold can be determined based on the application and the target user. However, since the characteristics of a turn at high speed and at low speed are different, in some embodiments the predetermined angular acceleration and/or deceleration threshold(s) can also be variable as a function of ground speed. Once sensor 100 transmits a sensor pulse or signal to control unit 80, control unit 80 can compare the actual angular velocity to the predetermined angular velocity threshold. Where the actual angular velocity is determined by control unit 80 to be less than the predetermined angular velocity threshold, method 500 can proceed to step 528 to determine if drive system 60 has been off for more than a predetermined amount of time, generally designated Z. Conversely, at step 526 where the actual angular velocity is determined by control unit 80 to be greater than the predetermined angular velocity threshold, method 500 can return to step 502.

At step 528, control unit 80 can determine whether drive system 60 has been off for more than predetermined amount of time Z. For example, predetermined length of time Z can be 0.5 seconds, which can be preprogramed into control unit 80. Predetermined length of time Z can be independent of predetermined lengths of time X and Y. Predetermined length of time Z can be set to prevent drive system 60 from being turned back on immediately after being turned off. This may happen, for e.g., when velocity is lagging the acceleration signal. Thus, the actual angular velocity of step 526 cannot trigger drive system 60 to immediately turn back on and must wait predetermined amount of time Z before proceeding to step 530 in order to automatically reengage drive system 60 to continue driving self-propelled machine 10 at the operator assigned ground speed input. Conversely, at step 528, if control unit 80 determines that drive system 60 has been off for less than predetermined length of time Z, then method 500 can return to step 502 and repeat the same method steps.

Regardless, drive system 60 can proceed to step 530 if any one of: angular deceleration exceeds a predetermined deceleration threshold (i.e. step 522); a predetermined length of time or time out limit is exceeded (i.e. step 524); or angular velocity of drive system is less than a predetermined velocity threshold and drive system has been off for more than a predetermined length of time (i.e. steps 526 and 528). To reiterate, only one of steps 522-526 need to be met in order for method 500 to continue to step 530.

At step 530, control unit 80 can be configured to turn drive system 60 on and resume operation at the operator assigned ground speed, where one or more of the three steps mentioned above are met. For example, the control scheme implemented by control unit 80 can apply a drive control multiplier of one (or any multiplier numerically larger than the multiplier used to shut off drive system 60) to the operator assigned ground speed. In this manner, the ground speed control signal input by the operator to control unit 80 can yield an output to transmission 60 of self-propelled machine 10 that corresponds to 100% of the ground speed control input by the operator.

At step 532, once drive system 60 is turned back on at step 530, data can be stored in control unit 80. Such data can consist of at least recorded time indicative of the actual time that drive system 60 was turned on (relative to the continuous time of step 506). Thus, the recorded time can be recorded in control unit 80 as the amount of time (e.g. in milliseconds) since system 60 was last off. After recordation of such information, method 500 can return to step 502.

Aspects of the subject matter disclosed herein may provide one or more of the following beneficial technical effects: improved control, improved ease-of-operation, intuitive controls, increased operator efficiency, improved comfort during operation, low operator fatigue, and easy to understand controls for a self-propelled, walk-behind working machine 10.

While the present subject matter has been has been described herein in reference to specific aspects, features, and illustrative embodiments, it will be appreciated that the utility of the invention is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, aspects, modifications and alternative embodiments, within its scope and including equivalents of the claims.

What is claimed is:

1. An automatic turn-sensing ground speed reduction system for a walk-behind, self-propelled machine having a main operative assembly and a handle that extends behind the main operative assembly, the system comprising:
    an actuation mechanism disposed at a distal end portion of the handle and located at a rear of the walk-behind, self-propelled machine, the actuation mechanism being configured for use by an operator to assign a ground speed of the walk-behind, self-propelled machine;
    a control unit; and
    a sensor configured to transmit a signal to the control unit, wherein the signal corresponds to an angular velocity of the walk-behind, self-propelled machine measured about a vertical axis perpendicular to a ground surface on which the walk-behind, self-propelled machine can be self-propelled;
    wherein the actuation mechanism is configured to allow one handed control of the walk-behind, self-propelled machine by the operator, and
    wherein the control unit is configured to automatically adjust the ground speed of the walk-behind, self-propelled machine during turning movement of the walk-behind, self-propelled machine based upon whether the signal exceeds a predetermined threshold value of one or more of velocity, angular velocity, acceleration, angular acceleration, orientation, and/or gravitational forces experienced by the walk-behind, self-propelled machine.

2. The system of claim 1, wherein the actuation mechanism is configured to transmit a control signal to the control unit, the control signal corresponding to the ground speed.

3. The system of claim 1, wherein the control unit is configured to apply a drive control multiplier to scale the ground speed of the walk-behind, self-propelled machine.

4. The system of claim 1, wherein the control unit is configured to shut off a drive system of the walk-behind, self-propelled machine during turning movement of the walk-behind, self-propelled machine, and the control unit is configured to turn on the drive system when one of a following set of criteria are met: an angular deceleration of the walk-behind, self-propelled machine is greater than a predetermined angular deceleration threshold, an angular velocity of the walk-behind, self-propelled machine is less than a predetermined angular velocity threshold, and the drive system is off for more than a predetermined timeout threshold.

5. The system of claim 1, wherein the control unit is configured to apply a first order recursive filter to the signal.

6. The system of claim 5, wherein the control unit is configured to calculate an angular acceleration of the walk-behind, self-propelled machine based on the filtered signal.

7. The system of claim 1, wherein the sensor is mounted on a printed circuit board on the walk-behind, self-propelled machine.

8. The system of claim 1, wherein the sensor comprises a gyroscope configured to transmit the signal to the control unit.

9. A walk-behind, self-propelled machine comprising an automatic turn-sensing ground speed reduction system, the walk-behind, self-propelled machine comprising:
- a main operative assembly;
- a handle that extends behind the main operative assembly of the walk-behind, self-propelled machine;
- an actuation mechanism disposed at a distal end portion of the handle, so as to be located at a rear of the walk-behind, self-propelled machine, the actuation mechanism being configured for use by an operator to assign a ground speed of the walk-behind, self-propelled machine;
- a control unit;
- a sensor configured to transmit a signal to the control unit, wherein the signal corresponds to an angular velocity of the walk-behind, self-propelled machine measured about a vertical axis perpendicular to a ground surface on which the walk-behind, self-propelled machine can be self-propelled; and
- a drive system configured to propel the walk-behind, self-propelled machine along the ground surface at the ground speed;
- wherein the actuation mechanism is configured to allow one handed control of the walk-behind, self-propelled machine by the operator, and
- wherein the control unit is configured to automatically adjust the ground speed of the walk-behind, self-propelled machine during turning movement of the walk-behind, self-propelled machine based upon whether the signal exceeds a predetermined threshold value of one or more of velocity, angular velocity, acceleration, angular acceleration, orientation, and/or gravitational forces experienced by the walk-behind, self-propelled machine.

10. The walk-behind, self-propelled machine of claim 9, wherein the actuation mechanism is configured to transmit a control signal to the control unit, the control signal corresponding to the ground speed.

11. The walk-behind, self-propelled machine of claim 9, wherein the control unit is configured to apply a drive control multiplier to scale the ground speed of the walk-behind, self-propelled machine.

12. The walk-behind, self-propelled machine of claim 9, wherein the control unit is configured to shut off the drive system during turning movement of the walk-behind, self-propelled machine, and is configured to turn on the drive system when one of a following set of criteria are met: an angular deceleration of the walk-behind, self-propelled machine is greater than a predetermined angular deceleration threshold, an angular velocity of the walk-behind, self-propelled machine is less than a predetermined angular velocity threshold, and the drive system is off for more than a predetermined timeout threshold.

13. The walk-behind, self-propelled machine of claim 9, wherein the control unit is configured to apply a first order recursive filter to the signal.

14. The walk-behind, self-propelled machine of claim 13, wherein the control unit is configured to calculate an angular acceleration of the walk-behind, self-propelled machine based on the filtered signal.

15. A method for implementing automatic turn-sensing ground speed reduction in a walk-behind, self-propelled machine, the method comprising:
- assigning, by an operator using an actuation mechanism disposed at a distal end portion of the handle so as to be located at a rear of the walk-behind, a ground speed of the walk-behind, self-propelled machine;
- transmitting a signal to a control unit;
- interpreting the signal in the control unit, wherein the signal corresponds to an angular velocity of the walk-behind, self-propelled machine measured about a vertical axis perpendicular to a ground surface on which the walk-behind, self-propelled machine can be self-propelled; and
- automatically adjusting the ground speed of the walk-behind, self-propelled machine in the control unit during turning movement of the walk-behind, self-propelled machine based upon whether the signal exceeds a predetermined threshold value of one or more of velocity, angular velocity, acceleration, angular acceleration, orientation, and/or gravitational forces experienced by the walk-behind, self-propelled machine,
- wherein the actuation mechanism is configured to allow one handed control of the walk-behind, self-propelled machine by the operator.

16. The method of claim 15, further comprising transmitting a control signal to the control unit, the control signal corresponding to the ground speed of the walk-behind, self-propelled machine.

17. The method of claim 15, further comprising applying a drive control multiplier to scale the ground speed of the walk-behind, self-propelled machine.

18. The method of claim 15, wherein automatically adjusting the ground speed of the walk-behind, self-propelled machine further comprises shutting off a drive system of the walk-behind, self-propelled machine during turning movement, and turning on the drive system when one of a following set of criteria are met: an angular deceleration of the walk-behind, self-propelled machine is greater than a predetermined angular deceleration threshold, an angular velocity of the walk-behind, self-propelled machine is less than a predetermined angular velocity threshold, and the drive system is off for more than a predetermined timeout threshold.

19. The method of claim 15, further comprising applying a first order recursive filter to the signal.

20. The method of claim 19, further comprising calculating an angular acceleration of the walk-behind, self-propelled machine in the control unit based on the filtered signal.

* * * * *